J. M. COLE.
TOOL FOR STRAIGHTENING CLENCHER RIMS.
APPLICATION FILED AUG. 1, 1919.
1,344,533.
Patented June 22, 1920.
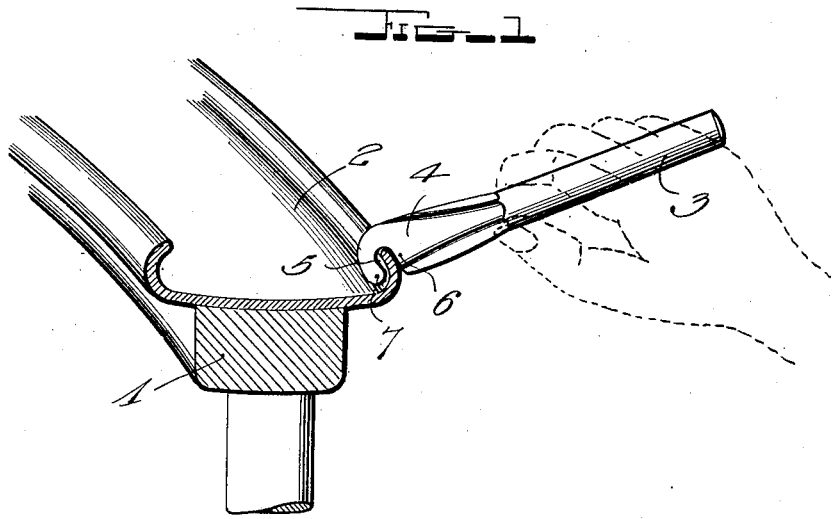
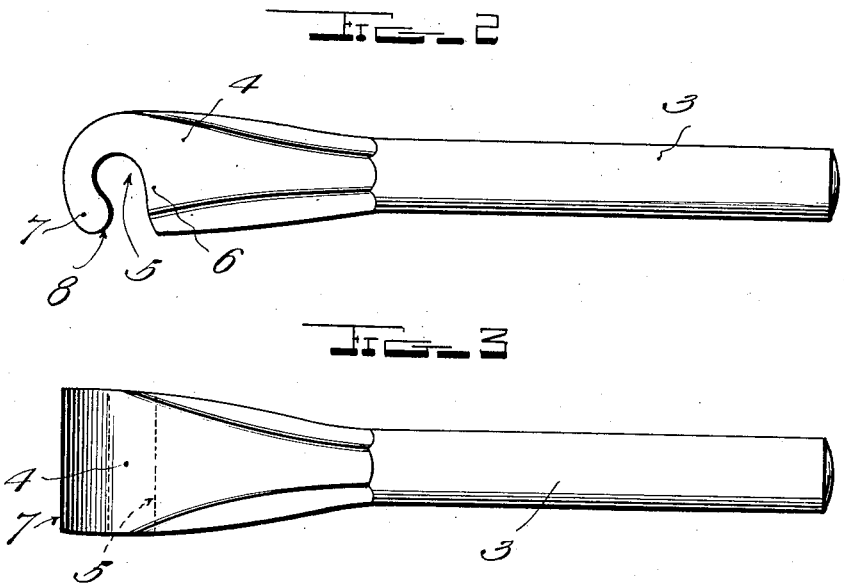
Witness
Inventor
J. M. Cole
By H. B. Wilson & Co.
Attorneys

UNITED STATES PATENT OFFICE.

JOHN M. COLE, OF BLOOMINGTON, ILLINOIS.

TOOL FOR STRAIGHTENING CLENCHER-RIMS.

1,344,533.  Specification of Letters Patent.  Patented June 22, 1920.

Application filed August 1, 1919. Serial No. 314,719.

*To all whom it may concern:*

Be it known that I, JOHN M. COLE, a citizen of the United States, residing at Bloomington, in the county of McLean and State of Illinois, have invented certain new and useful Improvements in Tools for Straightening Clencher-Rims; and I do declare the following to be a full, clear, and exact description of the invention, such as will enable others skilled in the art to which it appertains to make and use the same.

This invention relates to improvements in automobile tire rim tools, and it has more particular reference to a tool for straightening the bead engaging flange of a clencher rim.

It is a frequent practice among automobile drivers, especially drivers of Fords, when they get a puncture or blow-out in one of their tires, to take the tire off of the rim and run on the rim, consequently bending the bead engaging flanges of the same. Hence, it will be quite a problem to remount a tire on the bent rim and if successful in getting it on, it will be very severe on the bead of a tire, practically ruining the bead.

It is therefore the object of this invention to provide a simple and efficient tool to straighten and bend the rim into its former shape so that it can be used without injuring the bead or natural contour of the tire, thus saving the car owner expense of buying a new wheel or rim.

Another object of the invention is to provide a tool of the above mentioned type which is simple in construction, strong, durable and inexpensive to manufacture.

Other objects and advantages of the invention will be apparent during the course of the following description.

In the accompanying drawings forming a part of this specification and in which like numerals are employed to designate like parts throughout the same, Figure 1 is a perspective view of my improved tool, illustrating the use of the same on a clencher rim.

Fig. 2 is a side elevation thereof.

Fig. 3 is a top or plan view of the tool.

In the drawings, wherein for the purpose of illustration is shown a preferred embodiment of my invention, the numeral 1 indicates a felly of an automobile wheel having a clencher rim 2 of the usual construction secured thereto in any suitable manner.

My tool comprises a handle 3 which is preferably round as shown. This handle is provided with a head 4 which is preferably cast integral therewith and is tapered to the said handle and is substantially wider than the handle as shown. This head is provided with a rearwardly inclined channel or notch 5, thus dividing the said head into an inner and an outer jaw 6 and 7 respectively. The channel 5 extends transversely through the head from one side to an opposite parallel side and opens in a lateral direction with respect to the handle through a third side, the inner surface thereof being straight in a direction of its length. The inner surface of the inner jaw 6 is substantially flat and a slight bit longer than the outer jaw. The outer jaw 7 is rounded as shown at 8 to permit it to bear in and engage a similarly curved portion of a clencher rim in the manner shown in Fig. 1.

Thus it will be seen that the peculiar shape of the notch 5 and the inner and outer jaws 6 and 7 causes my tool to fit snugly on, and bear against a bead engaging flange of a clencher rim in such a manner as to bend and straighten said flange into the desired or proper shape.

It is believed that the manner of using the tool will be obvious from the foregoing illustration and description.

It is to be understood that the form of my invention herein shown and described is to be taken as a preferred example of the same, and that various changes in the shape, size and arrangement of parts may be resorted to without departing from the spirit of the invention or the scope of the subjoined claim.

Having thus described my invention, what I claim is:

A rim flange straightening tool comprising a handle having a head at one end, the head having a curved outer end merging into opposite side faces of the head, the head being cut transversely for its full width from one side face adjacent the curved end and toward the outer end of the head to provide a flange receiving pocket having a constricted mouth and inner and outer flange gripping jaws, the outer jaw having a concaved inner face and a rounded free end merging into the outer face of the outer jaw, the inner jaw having its face merging into the concaved face of the outer jaw at the inner end of the pocket and at its outer end curved to provide a work engaging face constituting a fulcrum and coöperating with the rounded free end of the outer jaw to slidably engage and bend a rim flange from opposite sides.

In testimony whereof I have hereunto set my hand.

JOHN M. COLE.